United States Patent [19]
Zumstein

[11] Patent Number: 5,382,772
[45] Date of Patent: Jan. 17, 1995

[54] INSTALLATION FOR CUTTING A WORKPIECE

[75] Inventor: Ernst Zumstein, Burgdorf, Switzerland

[73] Assignee: Bystronic Laser AG, Niederonz, Switzerland

[21] Appl. No.: 66,431

[22] Filed: May 25, 1993

[30] Foreign Application Priority Data

May 26, 1992 [EP] European Pat. Off. ......... 92810394.4

[51] Int. Cl.⁶ ............................................. B23K 26/00
[52] U.S. Cl. ................................................ 219/121.67
[58] Field of Search ..................... 219/121.67, 121.72

[56] References Cited

U.S. PATENT DOCUMENTS 5,185,510 2/1993 Zumstein ..................... 219/121.67

FOREIGN PATENT DOCUMENTS 0327895 8/1989 European Pat. Off. .
61-283483 12/1986 Japan .

Primary Examiner—C. L. Albritton
Attorney, Agent, or Firm—Marks & Murase

[57] ABSTRACT

The flat stock (7) to be cut by means of a cutting head (8) rests on a grate of supporting arms (5) which are hinged on a shaft (4). By lowering groups of supporting arms (5) or all present supporting arms, cut pieces or residual skeletons, respectively, can be released and are allowed to drop onto a conveyor belt (22) for disposal. Each of said supporting arms (5) is connected to a control rod (11) which is capable of being reciprocated by means of a slider (20) comprising a pneumatic actuating cylinder (21) in order to couple a coupling tooth (18) either to a stationary holding beam (12) or to a coupling ledge (14a) of a vertically displaceable driving beam (14). A common drive for a plurality of supporting arms (5) is thus provided, and merely a coupling unit for each supporting arm is necessary.

11 Claims, 3 Drawing Sheets

INSTALLATION FOR CUTTING A WORKPIECE

BACKGROUND OF THE INVENTION

The present invention refers to an installation for cutting a workpiece, in particular flat stock, comprising a grate of supporting elements for said workpiece which are capable of being moved out of a supporting position. Such installations are known, e.g. from EP-A-0,464,296, in particular for cutting flat stock by means of a laser beam. In the abovementioned installation, pivotable supporting arms for said flat stock can either be swung away by a small angle in order to avoid the laser beam during its passage over a given supporting arm and thus to prevent damages, or said supporting arms may be swung down completely in order to drop cut pieces or residual skeletons onto a conveyor belt. In this case, an individual driving member, e.g. a pneumatic cylinder, is associated to each supporting arm. This construction is complicated, and the compressed air consumption is considerable. The space requirement of each individual driving unit does not allow to reduce the distance between neighboring supporting arms below a certain limit. It may also be difficult to contain the noise, particularly when all supporting arms are lowered simultaneously.

SUMMARY OF THE INVENTION

It is the object of the present invention to simplify and improve said driving system. This object is attained by an installation for cutting a workpiece, in particular flat stock, comprising a grate of supporting elements for said workpiece, said supporting elements being capable of being moved out of a supporting position, wherein at least one common driving member for a plurality of supporting elements is provided to which individual supporting elements can be coupled. The number of actual driving units, e.g. pneumatic cylinders, can thus be decisively reduced. In order to couple the respective supporting elements to their driving members, relatively small, weak actuating members are sufficient, e.g. pneumatic cylinders requiring only small amounts of compressed air. The reduced space consumption of the coupling means and of their driving units substantially allows to dispose neighboring supporting elements as close to each other as desired.

The supporting elements, i.e. pivotable supporting arms, are preferably provided with an indented supporting edge, so that it is no longer necessary to remove said supporting elements from the workpiece while the cutting beam passes over said elements. This also results in an operating method for the installation according to this invention, wherein individual supporting elements are moved out of their supporting position only in order to dispose of cut pieces or residual skeletons. This is advantageous in that considerably fewer movements of the supporting elements are required, which in turn results in a reduction of the compressed air consumption, of the wear, and of the produced noise.

The invention is explained in more detail hereinafter with reference to a drawing of an embodiment.

SHORT DESCRIPTION OF THE DRAWINGS

FIG. 1 shows a side elevation of the installation;
FIG. 2 shows a cross-section across the installation; and
FIG. 3 shows a partial cross-section on an enlarged scale.

DETAILED DESCRIPTION OF THE INVENTION

Figure 1:
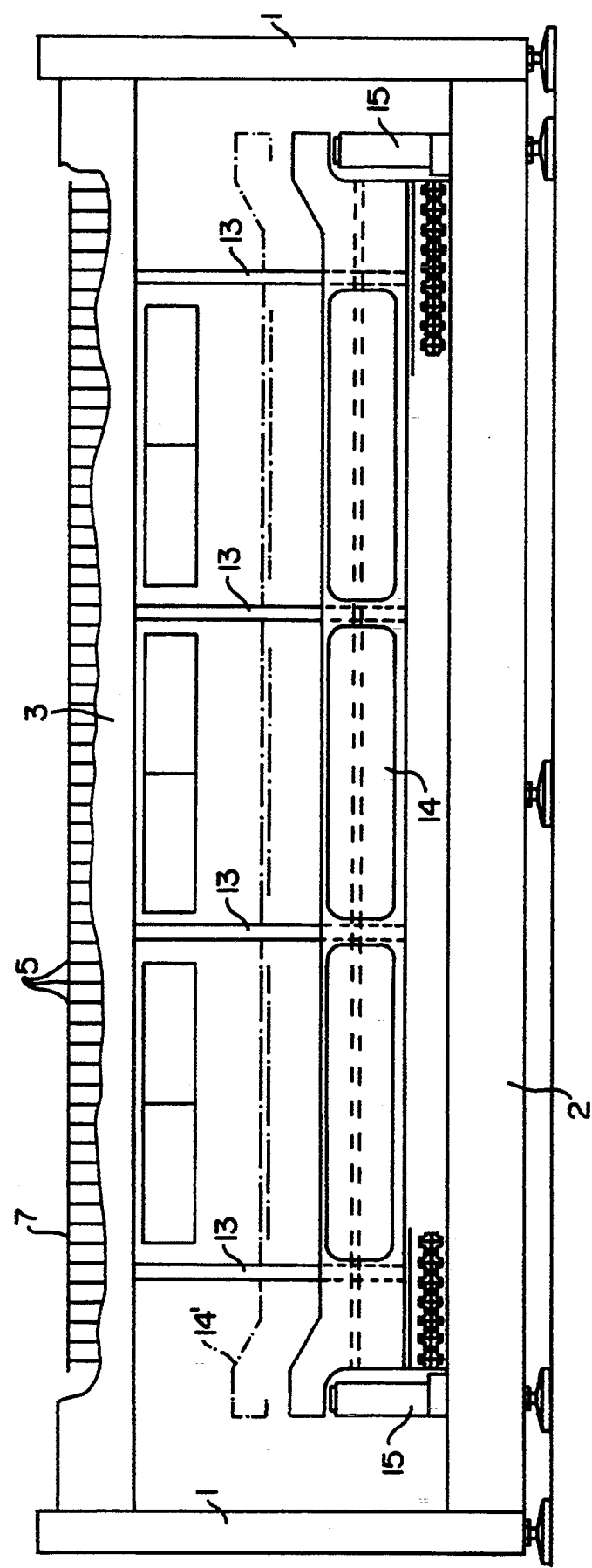

The illustrated cutting installation comprises a mount having frontal frames 1, a lower longitudinal frame 2 on both sides and an upper longitudinal frame 3 on both sides, upper longitudinal frame 3 being partly cut away in FIG. 1. In the upper part of said mount, longitudinal shafts 4 are provided on both sides (FIG. 2), on which supporting arms 5 are hinged which extend nearly to the center. On their upper sides, said supporting arms comprise an indented supporting surface 6 which supports a plate 7 from which parts are to be cut out by means of a cutting head shown in FIG. 3, more particularly a laser cutting head 8. Cutting head 8 can be driven to any position over the entire surface of plate 7 in a non-represented but known manner in order to cut out pieces along any desired contour lines. Due to the indentations in supporting surfaces 6 of supporting arms 5, damages of said supporting surfaces or of the underside of plate 7 by the laser beam are improbable.

Connected to each supporting arm 5 is a lever 9 whose free end is connected by an articulation 10 to a control rod 11. At the bottom, each control rod 11 passes between a holding beam 12 which is rigidly connected to the machine mount and a movable driving beam 14 which is guided on bars 13. Driving beam 14 is vertically displaceable by two lateral hydraulic or pneumatic cylinders 15, namely from the lower rest position shown in full lines in FIGS. 1 and 2 to an upper position 14' shown in segmented lines. Connected to driving beam 14 is coupling ledge 14a which is provided with a coupling groove 16. Stationary holding beam 12 is provided with a corresponding coupling groove 17. A coupling tooth 18 of control rod 11 extending to both sides selectively engages in one or the other of grooves 16 or 17, whereby rod 11 is coupled either to holding beam 12 or to coupling ledge 14a. For this purpose, the lower end of control rod 11 extends through a cross hole of a driver 20 which is reciprocated by means of a pneumatic cylinder 21 in order to couple coupling tooth 18 either to holding beam 12 or to coupling ledge 14a and thus indirectly to driving beam 14.

A conveyor belt 22 serves for disposing of cut pieces or residual skeletons in a manner described hereinafter.

Figure 3:
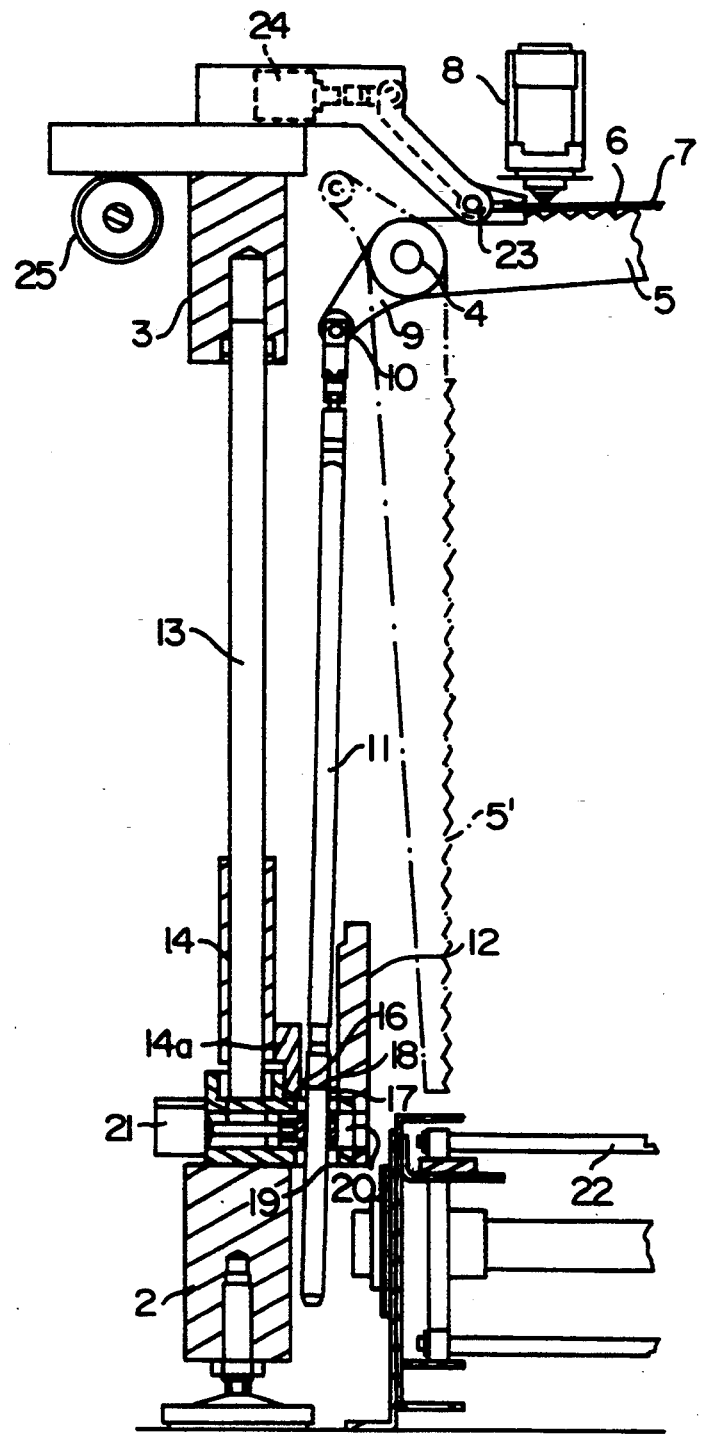

FIG. 3 shows tongs 23 which hold the edge of plate 7. A plurality of such tongs are provided which hold plate 7 during machining and release it in order to dispose of the residual skeleton. An actuating unit 24 serves for opening and closing tongs 23, while a driving unit 25 serves for the displacement of tongs 23 in order to adapt to different plate formats.

Figure 2:
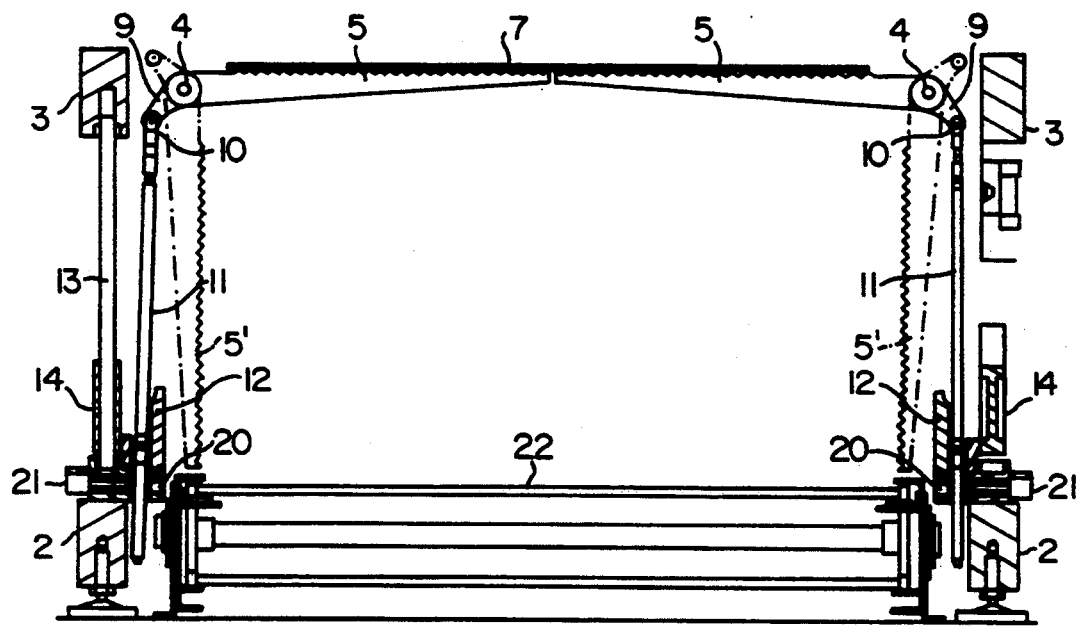

The operation of the illustrated installation largely follows from the above description already. FIGS. 2 and 3 show the installation in an operational condition with illustrated supporting arms 5 in a horizontal supporting position. Control rods 11 are displaced inwards and coupled to stationary holding beams 12. Control rods 11 and supporting arms 5 are thus locked in the represented position. They remain in this position until a piece is completely cut out from plate 7. When this is the case, the arms 5 supporting the cut piece are swung down to the lowered position 5', which is shown in segmented lines, by displacing control rods 11 outwards, i.e. to the left in FIG. 3, by means of associated cylinders 21 and sliders 20, whereby said control rods are uncoupled from holding beam 12 and coupled to coupling ledge 14a. Drive cylinders 15 are then actuated in order to displace driving beam 14 to its upper operating position (14'). Control rods 11, which are coupled to coupling ledge 14a, are lifted by this movement and swing the connected supporting arms 5 to the lowered position 5'. The cut piece thus falls onto conveyor belt 22 and is carried away. Driving beam 14 is then lowered again, control rods 11 and supporting arms 5 coupled therewith are swung up to the supporting position, and a new cutting operation can be started unless it is previously started in another portion of plate 7 that is being supported by supporting arms 5. When all cut pieces are disposed of in this manner, all supporting arms 5 are lowered and all tongs 23 opened and retracted, whereby the residual skeleton of plate 7 drops onto conveyor belt 22 and may be disposed of. Supporting arms 5 are then lifted again, and a new plate 7 is laid on and seized by tongs 23.

I claim:

1. In an installation for cutting a workpiece, in particular flat stock, comprising a grate of supporting elements for said workpiece, means for moving said supporting elements out of a supporting position, the improvement that, at least one common driving member for a plurality of supporting elements is provided to which individual supporting elements can be coupled.

2. The installation of claim 1, wherein each of said supporting elements is capable of being individually coupled to said driving member.

3. The installation of claim 1, comprising pivotable supporting arms, wherein each supporting arm is connected to a control rod which is capable of being coupled to said driving member.

4. The installation of claim 1, wherein each of said supporting elements is coupled in its supporting position to a stationary holding member and is capable of being selectively coupled to said holding member and to said driving member.

5. The installation of claim 1, comprising pivotable supporting arms, wherein each supporting arm is connected to a control rod which is capable of being coupled to said driving member, wherein each of said supporting elements is coupled in its supporting position to a stationary holding member and is capable of being selectively coupled to said holding member and to said driving member, and wherein each of said control rods is pivotably mounted and is capable of being coupled to said holding member or to said driving member by pivoting.

6. The installation of claim 1, wherein a coupling drive is associated to each of said supporting elements.

7. The installation of claim 1, wherein said driving member is designed as a reciprocating beam.

8. The installation of claim 1, wherein said supporting elements are provided with an indented supporting edge.

9. The installation of claim 1, further comprising control means for moving individual supporting elements out of their supporting position only in order to dispose of cut pieces or residual skeletons.

10. The installation of claim 6, wherein said coupling drive comprises a pneumatic cylinder or an electromagnet.

11. The installation of claim 8, wherein said supporting elements comprise supporting arms.

* * * * *